United States Patent
Gandhi et al.

(10) Patent No.: US 9,185,048 B2
(45) Date of Patent: *Nov. 10, 2015

(54) DATA TRANSMISSION BETWEEN DEVICES BASED ON BANDWIDTH AVAILABILITY

(71) Applicant: Facebook, Inc., Menlo Park, CA (US)

(72) Inventors: Shaheen Ashok Gandhi, Seattle, WA (US); David Scott Reiss, Mountain View, CA (US); David Harry Garcia, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/145,525

(22) Filed: Dec. 31, 2013

(65) Prior Publication Data

US 2014/0115156 A1    Apr. 24, 2014

Related U.S. Application Data

(63) Continuation of application No. 13/099,973, filed on May 3, 2011, now Pat. No. 8,671,185.

(51) Int. Cl.
| | |
|---|---|
| *G06F 15/16* | (2006.01) |
| *H04L 12/911* | (2013.01) |
| *H04W 72/12* | (2009.01) |
| *H04L 29/08* | (2006.01) |
| *G06Q 50/00* | (2012.01) |
| *H04W 28/26* | (2009.01) |
| *H04W 48/18* | (2009.01) |

(52) U.S. Cl.
CPC ............. *H04L 47/823* (2013.01); *G06Q 50/01* (2013.01); *H04L 67/22* (2013.01); *H04L 67/306* (2013.01); *H04W 72/1252* (2013.01); *H04W 28/26* (2013.01); *H04W 48/18* (2013.01)

(58) Field of Classification Search
CPC ..... H04L 65/1059; H04L 67/30; H04L 67/22; H04L 47/823; H04W 28/26; H04W 72/1252; G06F 15/16; G06Q 50/01
USPC ............................ 709/224; 370/331; 455/414
See application file for complete search history.

(56) References Cited

U.S. PATENT DOCUMENTS

| | | | |
|---|---|---|---|
| 2005/0234922 A1* | 10/2005 | Parekh et al. .................... 707/10 |
| 2006/0253685 A1* | 11/2006 | Wong et al. ..................... 712/25 |
| 2008/0181179 A1* | 7/2008 | Karaoguz ..................... 370/331 |
| 2009/0124241 A1* | 5/2009 | Krishnaswamy et al. . 455/414.2 |
| 2009/0125321 A1* | 5/2009 | Charlebois et al. ............... 705/1 |
| 2009/0157513 A1* | 6/2009 | Bonev et al. ..................... 705/14 |
| 2009/0313299 A1* | 12/2009 | Bonev et al. ............. 707/103 R |
| 2011/0151839 A1* | 6/2011 | Bolon et al. ............... 455/414.1 |
| 2011/0225417 A1* | 9/2011 | Maharajh et al. ............. 713/150 |
| 2011/0239276 A1* | 9/2011 | Garcia Garcia et al. .......... 726/4 |

* cited by examiner

*Primary Examiner* — Tesfay Yohannes
(74) *Attorney, Agent, or Firm* — Baker Botts L.L.P.

(57) ABSTRACT

In one embodiment, in response to data to be transmitted to or from an electronic device, the electronic device determines whether the electronic device currently has a first network connection with a sufficiently high bandwidth. If the electronic device currently does not have a first network connection with a sufficiently high bandwidth, then the electronic device estimates a future time when the electronic device is likely to have a second network connection with a sufficiently high bandwidth, and schedules transmission of the data at the future time.

18 Claims, 3 Drawing Sheets

DATA TRANSMISSION BETWEEN DEVICES BASED ON BANDWIDTH AVAILABILITY

PRIORITY

This application is a continuation under 35 U.S.C. §120 of U.S. patent application Ser. No. 13/099,973, filed 3 May 2011, which is incorporated herein by reference.

TECHNICAL FIELD

This disclosure generally relates to transmitting data between two devices and more specifically relates to transmitting data from one device to another device based on the bandwidth available to either one or both devices.

BACKGROUND

Often, one electronic device may need to send data to another electronic device over a computer or communications network. For example, in a client-server environment, a client may send data on the client to a server, and similarly, a server may send data on the server to a client. As another example, a user may synchronize data between two of his/her electronic devices by sending data from one device to the other device.

SUMMARY

This disclosure generally relates to transmitting data between two devices and more specifically relates to transmitting data from one device to another device based on the bandwidth available to either one or both devices.

In particular embodiments, in response to data to be transmitted to or from an electronic device, the electronic device determines whether the electronic device currently has a first network connection with a sufficiently high bandwidth. If the electronic device currently does not have a first network connection with a sufficiently high bandwidth, then the electronic device estimates a future time when the electronic device is likely to have a second network connection with a sufficiently high bandwidth, and schedules transmission of the data at the future time.

These and other features, aspects, and advantages of the disclosure are described in more detail below in the detailed description and in conjunction with the following figures.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Often, a first electronic device may send data to a second electronic device over a computer or communications network. Sometimes, the amount of data to be transmitted may be relatively small so that the data may be transmitted in a relatively short period of time, even if the bandwidth of the network connections for either or both of the two devices may be low. Other times, the amount of data to be transmitted may be relatively large. In this case, the period of time needed to transmit the data may be relatively long, especially if the bandwidth of the network connections for either or both of the two devices is low.

In particular embodiments, one or both of the electronic devices sending and receiving the data may be connected to a network wirelessly. In particular embodiments, one or both of the electronic devices sending and receiving the data may be a mobile device. Sometimes, an electronic device may support multiple means of wireless communications. For example, an electronic device, such as a mobile phone or a tablet computer, may connect to a computer or communications network through a cellular radio connection (e.g., cellular or 3G) or a Wi-Fi (IEEE 802.11) connection. Some types of wireless connections may have relatively higher bandwidths, while other types of wireless connections may have relatively lower bandwidths. For example, a Wi-Fi connection often has a higher bandwidth than a cellular radio connection. Thus, in particular embodiments, when one electronic device sends or receives data to or from another electronic device, if the first electronic device connects to a network wirelessly and the amount of data to be transmitted is relatively large, then it may be desirable to transmit the data over a wireless connection that has a relatively higher bandwidth. This may be desirable to allow the user to use available bandwidth for other applications, reduce the cost of network access, and/or to conserve battery power.

Figure 1:
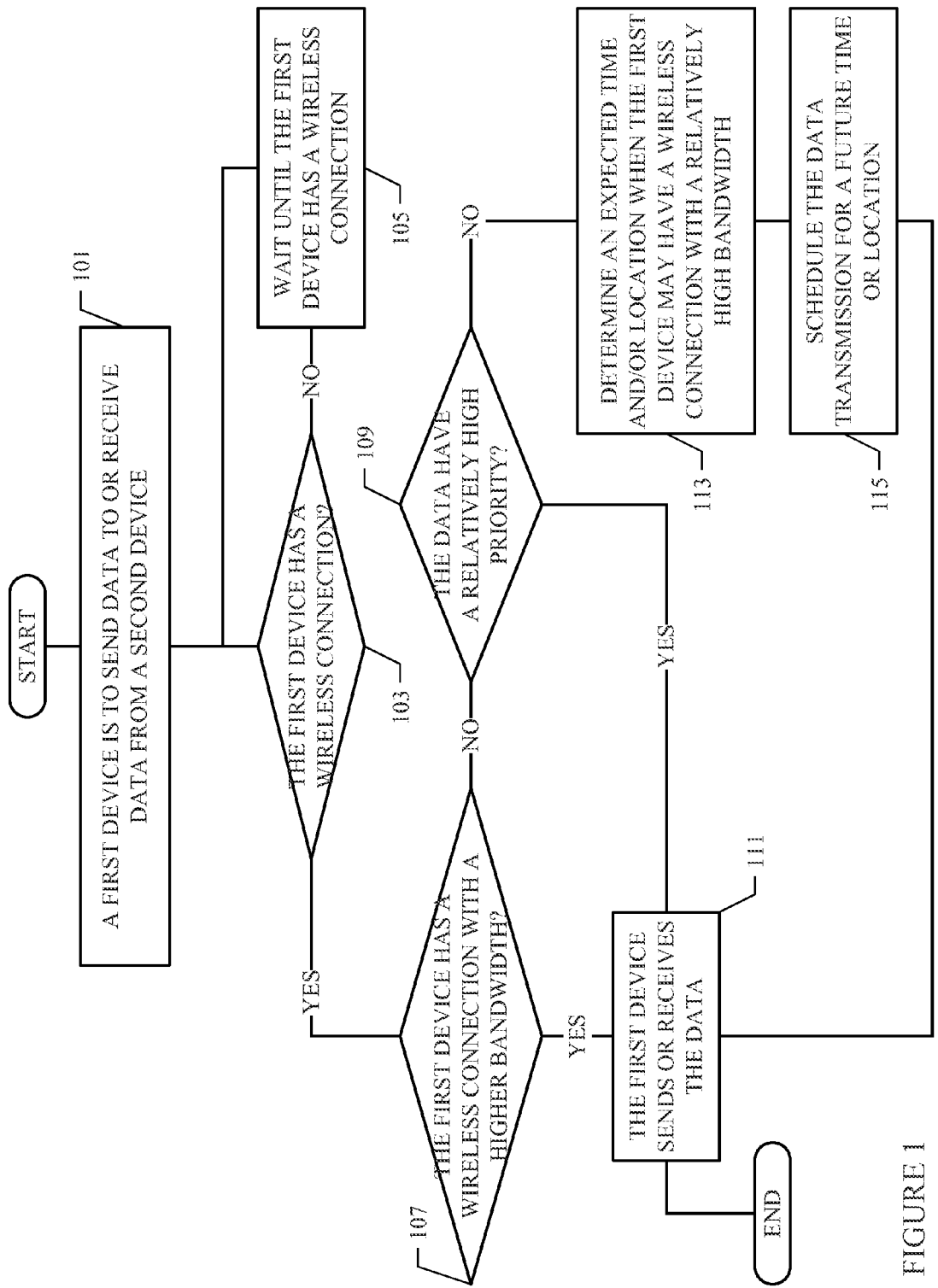
FIG. 1 illustrates an example method for transmitting data between a first electronic device and a second electronic device based on the bandwidth available to the first electronic devices.

FIG. 1 illustrates an example method for transmitting data between a first electronic device and a second electronic device based on the bandwidth available to the first electronic devices. In particular embodiments, the first electronic device sends data to or receives data from the second electronic device. In particular embodiments, the first device is capable of connecting to a computer or communications network. In particular embodiments, the first electronic device connects to a computer or communications network wirelessly. In particular embodiments, the first electronic device supports multiple means of wireless communications. In particular embodiments, the first electronic device is associated with a user. For example, the first electronic device may be a mobile phone, a smart phone, a tablet computer, or a personal digital assistant (PDA).

Suppose that the first device needs to send data to or receive data from the second device, as illustrated in STEP 101. For example, the second device may be a server hosting a social-networking website. The user of the first device may be a user of the social-networking website and may access his/her account with the social-networking website through the first device. The user may upload photos or videos to his/her account at the social-networking website to be stored in some data store associated with the social-networking website, send messages to other users of the social-networking website, or download messages, posts, event information, or photos sent to his/her account at the social-networking website.

If the first device connects to a network wirelessly, then depending on the current location or status of the first device, the first device may or may not have a wireless connection at the moment, as illustrated in STEP 103. For example, suppose that the first device is a mobile telephone. If the user takes his/her mobile telephone to a underground facility or a rural area, the mobile telephone may not be able to receive any radio signal. Or, if the battery of the mobile telephone runs too low, the mobile telephone may not have sufficient power to connect with a cellular tower.

If the first device does not have any wireless connection to a network at the moment (STEP 103—"NO"), then the user needs to wait until the first device has a wireless connection to a network before the data may be sent to or received from the second device, as illustrated in STEP 105.

On the other hand, if the first device has a wireless connection to a network at the moment (STEP 103—"YES"), then particular embodiments may determine whether that wireless connection has a relatively higher bandwidth or a relatively lower bandwidth, as illustrated in STEP 107. As described above, the first device may be able to connect to a network through multiple types of wireless connections (e.g., cellular or Wi-Fi). Some types of wireless connections (e.g., Wi-Fi) may have higher bandwidths than other types of wireless connections (e.g., cellular). The bandwidth of a wireless connection may be determined using any applicable means. For example, the bandwidth of a wireless connection may be determined based on the type of the connection (e.g., cellular network connection vs. Wi-Fi connection, or 3G connection vs. standard cellular connection). As another example, the bandwidth of a wireless connection may be determined by sending a test or probe packet over the connection.

In particular embodiments, a predetermined threshold may be used to determine if the bandwidth of a wireless connection is considered high or low. More specifically, if the bandwidth of a wireless connection is at or above the threshold, particular embodiments may consider that the connection has a relatively higher bandwidth. Conversely, if the bandwidth of a wireless connection is below the threshold, particular embodiments may consider that the connection has a relatively lower bandwidth.

If the wireless connection the first device has at the moment has a relatively higher bandwidth (e.g., a Wi-Fi connection) (STEP 107—"YES"), in particular embodiments, the first device may send the data to or receive the data from the second device immediately over the wireless connection that has the relatively higher bandwidth, as illustrated in STEP 111.

On the other hand, if the wireless connection the first device has at the moment has a relatively lower bandwidth (e.g., a cellular connection) (STEP 107—"NO"), or if the cellular tower to which the first device is connected has a relatively higher workload (e.g., a large number of mobile devices are connected to the cellular tower at that particular time and so the cellular tower may be overloaded with servicing many mobile devices at the same time), then particular embodiments may determine whether the data to be sent or received have a relatively higher priority, as illustrated in STEP 109. Optionally, particular embodiments may also determine whether the amount of data to be sent or received is relatively large. For example, if the amount of data to be sent or received is relatively small (e.g., a few kilobytes), then even if the wireless connection the first device has at the moment has a relatively lower bandwidth, the first device may still choose to send or receive the data, since it may only take a short period of time (e.g., a few minutes) to transmit the data due to the small amount of data need to be transmitted. On the other hand, if the amount of data to be sent or received is relatively large (e.g., several hundred megabytes), then if the wireless connection the first device has at the moment has a relatively lower bandwidth, it may take a very long time (e.g., half an hour) to transmit the data over the slower wireless connection.

In this case, in particular embodiments, the first device may decide whether to send or receive the data immediately over the slower wireless connection or wait until a later time when the first device may have a faster wireless connection before sending or receiving the data depending on how important the data are. For example, if the user needs the information provided by the data immediately or fairly quickly (e.g., the data provide a map with driving directions to a location that the user needs to go to), then the data may be considered to have a higher priority. As another example, if it does not make much difference whether the data are transmitted immediately or at a later time (e.g., the user wants to update some photos to his/her account with the social-networking website), then the data may be considered to have a lower priority.

In particular embodiments, there may be an operating system on the first device. The operating system may include a kernel and a number of device drivers associated with the hardware components of the first device. For example, the first device may include a Global Positioning System (GPS) sensor capable of determining the GPS coordinates of the first device at a given time. The GPS coordinates may be used to determine the physical location of the first device at a given time. There may be a number of software applications on the first device as well, which may be executed in the environment provided by the operating system. A module of the operating system (e.g., a driver) or an application may cause data to be sent from or received at the first device. In particular embodiments, when a software module causes data to be sent from or received at the first device, the software module may provide information indicating the amount and/or the priority level (e.g., whether the data are needed immediate, how important the data are) of the data to be transmitted. This information may be used to determine whether the data should be transmitted immediately or at a later time.

If the data have a relatively higher priority (STEP 109—"YES"), then in particular embodiments, the first device may send or receive the data immediately, even if the wireless connection the first device has at the moment has a relatively lower bandwidth, as illustrated in STEP 111.

On the other hand if the data have a relatively lower priority (STEP 109—"NO"), then particular embodiments may determine a future time when the first device may have a wireless connection with a relatively higher bandwidth, as illustrated in STEP 113, and schedule the data transmission for that future time, as illustrated in STEP 115. When the scheduled time arrives, the first device may then send or receive the data, as illustrated in STEP 111.

Particular embodiments may monitor and collect the user's online activities, especially activities in connection with the first device, and other information of the first device (e.g., the GPS coordinates provided by the first device) to construct a behavior profile for the user. The profile may include information such as, for example and without limitation, the location the user with the first device is likely to be at a particular time (e.g., morning, afternoon, evening, weekdays, weekends), the length of time the user may stay at a location, whether a location allows for access to a faster (e.g., a Wi-Fi connection) or slower wireless connection or no connection at all, the signal strength of the wireless connection at a location, and so on. The user's online activities and device information may be monitored by the user's device and collected continually so that the user's behavior profile may be updated from time to time based on the latest information collected for the user's device.

Based on the information in the user's behavior profile, particular embodiments may estimate whether the user with the first device may be at a location with a faster wireless connection (e.g., a connection with a higher bandwidth) at a time in the near future. For example, if the user's profile suggests that the user with the first device is very likely to be at a location (e.g., a coffee house) that has a Wi-Fi connection in approximately one hour's time, then particular embodiments may schedule the transmission of the low priority data for that time so that the data may be transmitted over the Wi-Fi connection and thus the transmission may take less time. In one implementation, a user profile may include a probability value for given time intervals (e.g., 1 hour intervals) across a week (or other time period) indicating the likelihood that the first user will be at a location allowing for access to a relatively higher bandwidth connection. Such a user profile may be based on a process implemented on the user's device that wakes up on a periodic basis and scans for available network connections and records them in association with location coordinates provided by a GPS sensor.

If, based on the information in the user's behavior profile, it is estimated that the user with the first device is unlikely to be at any location with a faster wireless connection in the near future (e.g., not in the next 6 hours), then it may be desirable to transmit the data immediately rather than waiting for a long time for the first device to have a faster wireless connection. Alternatively, if applicable, a portion of the data may be transmitted immediately, and the rest of the data may be transmitted at a later time when the first device has a wireless connection with a higher bandwidth. For example, if the user wishes to upload some photos on his/her device to a server, a low-resolution version of the photos (e.g., thumbnails of the photos) may be sent to the server immediately, and the high-resolution version of the photos may be sent to the server at a later time when the first device eventually has a faster wireless connection.

Suppose that a user wishes to upload a set of images (e.g., photos taken with the user's mobile device) from his mobile device (i.e., the first device) to a server (i.e., the second device), and these images have relatively higher resolutions and thus relatively larger file sizes. Further suppose that the first device currently has a wireless connection with a relatively lower bandwidth and is estimated as being unlikely to be at any location with a faster connection in the near future (e.g., based on the user's behavior profile). In particular embodiments, a set of thumbnails (e.g., images with relatively lower resolutions and thus relatively smaller file sizes) may be created for the set of higher-resolution images. This set of thumbnails may be sent to the second device first. Since these thumbnails have relatively smaller file sizes, even with a slower wireless connection, they may be transmitted within a reasonable amount of time. Then some time in the future, when the first device eventually is able to acquire a faster wireless connection, the set of higher-resolution images may be sent to the second device.

Based on the information in the user's behavior profile, particular embodiments may also estimate whether the user with the first device may be at a location with no wireless connection at all in the near future. If this may be the case, it may be desirable to ensure that the data are transmitted before the first device loses its wireless connection, especially if the first device may not have any connection for a long time. Thus, if there are data that need to be transmitted, particular embodiments may start the transmission immediately, even if the first device may have a slower wireless connection. Still further, the current location of the user may not sufficient correspond to the user location history corresponding to the user profile. In this instance, the first device may perform any number of actions discussed above (transmitting immediately or waiting for a relatively higher bandwidth connection), which are a matter of engineering and design choice. Furthermore, the first device may apply the same or a different process when a previously scheduled transmission is currently due for transmission. For example, if a scheduled transmission is due for transmission but no higher bandwidth connection is available, the first device may defer transmission or transmit immediately. In some implementations, the decision may be biased based on the number of transmit attempts.

In particular embodiments, the method illustrated in FIG. 1 may be used by users of a social-networking website to synchronize data between the user devices and the servers hosting the social-networking website. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

In particular embodiments, a user of a social-networking website may access the social-networking website or his/her user account with the social-networking website using a mobile device (e.g., a smart phone or a tablet computer). The mobile device may be connected to a computer or communications network wirelessly (e.g., through a Wi-Fi, 3G, or cellular connection). When the mobile device sends or receives data to or from one of the servers hosting the social-networking website (e.g., when the user uploads photos taken with the mobile device to his/her user account with the social-networking website), the method illustrated in FIG. 1 may be applied.

Figure 2:
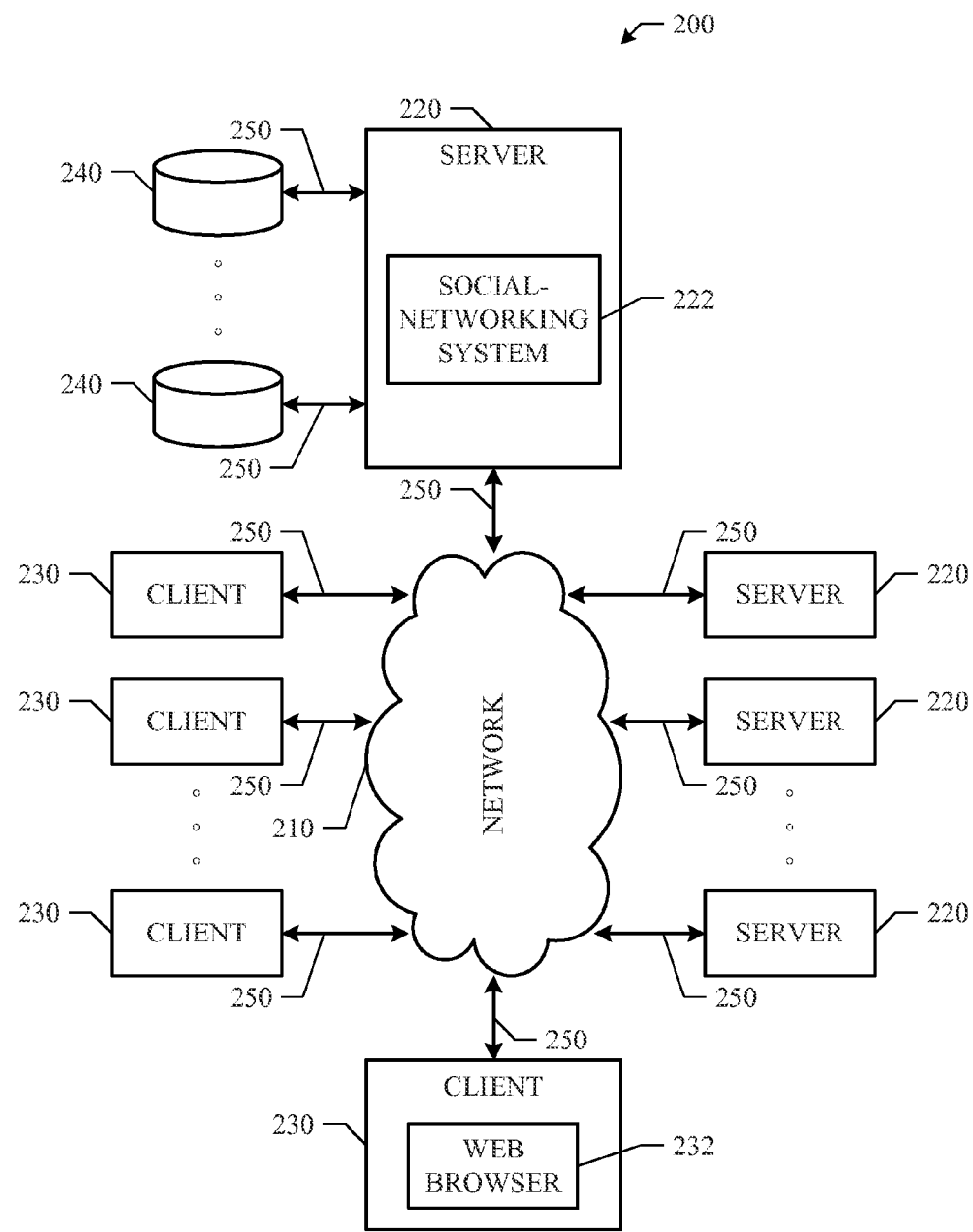
FIG. 2 illustrates an example network environment.

Particular embodiments may be implemented in a network environment. FIG. 2 illustrates an example network environment 200. Network environment 200 includes a network 210 coupling one or more servers 220 and one or more clients 230 to each other. In particular embodiments, network 210 is an intranet, an extranet, a virtual private network (VPN), a local area network (LAN), a wireless LAN (WLAN), a wide area network (WAN), a metropolitan area network (MAN), a portion of the Internet, or another network 210 or a combination of two or more such networks 210. This disclosure contemplates any suitable network 210.

One or more links 250 couple a server 220 or a client 230 to network 210. In particular embodiments, one or more links 250 each includes one or more wireline, wireless, or optical links 250. In particular embodiments, one or more links 250 each includes an intranet, an extranet, a VPN, a LAN, a WLAN, a WAN, a MAN, a portion of the Internet, or another link 250 or a combination of two or more such links 250. This disclosure contemplates any suitable links 250 coupling servers 220 and clients 230 to network 210.

In particular embodiments, each server 220 may be a unitary server or may be a distributed server spanning multiple computers or multiple datacenters. Servers 220 may be of various types, such as, for example and without limitation, web server, news server, mail server, message server, advertising server, file server, application server, exchange server, database server, or proxy server. In particular embodiments, each server 220 may include hardware, software, or embedded logic components or a combination of two or more such components for carrying out the appropriate functionalities implemented or supported by server 220. For example, a web server is generally capable of hosting websites containing web pages or particular elements of web pages. More specifically, a web server may host HTML files or other file types, or may dynamically create or constitute files upon a request, and communicate them to clients 230 in response to HTTP or other requests from clients 230. A mail server is generally capable of providing electronic mail services to various clients 230. A database server is generally capable of providing an interface for managing data stored in one or more data stores. In particular embodiments, a social-networking system 222, implementing a social-networking website, may be hosted on one or more servers 220.

In particular embodiments, one or more data storages 240 may be communicatively linked to one or more severs 220 via one or more links 250. In particular embodiments, data storages 240 may be used to store various types of information. In particular embodiments, the information stored in data storages 240 may be organized according to specific data structures. In particular embodiments, each data storage 240 may be a relational database. Particular embodiments may provide interfaces that enable servers 220 or clients 230 to manage, e.g., retrieve, modify, add, or delete, the information stored in data storage 240.

In particular embodiments, each client 230 may be an electronic device including hardware, software, or embedded logic components or a combination of two or more such components and capable of carrying out the appropriate functionalities implemented or supported by client 230. For example and without limitation, a client 230 may be a desktop computer system, a notebook computer system, a netbook computer system, a handheld electronic device, or a mobile telephone. This disclosure contemplates any suitable clients 230. A client 230 may enable a network user at client 230 to access network 230. A client 230 may enable its user to communicate with other users at other clients 230.

A client 230 may have a web browser 232, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 230 may enter a Uniform Resource Locator (URL) or other address directing the web browser 232 to a server 220, and the web browser 232 may generate a Hyper Text Transfer Protocol (HTTP) request and communicate the HTTP request to server 220. Server 220 may accept the HTTP request and communicate to client 230 one or more Hyper Text Markup Language (HTML) files responsive to the HTTP request. Client 230 may render a web page based on the HTML files from server 220 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 3:
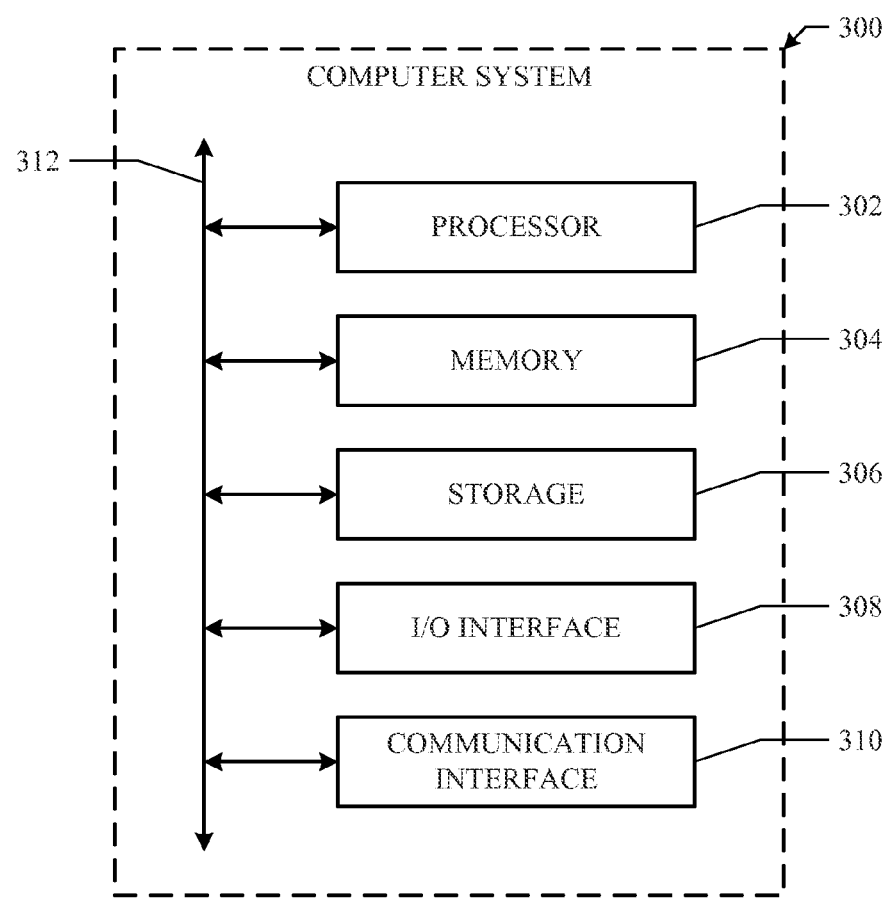
FIG. 3 illustrates an example computer system.

Particular embodiments may be implemented on one or more computer systems. FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 300 may include one or more computer systems 300; be unitary or distributed; span multiple locations; span multiple machines; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs).

Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include an HDD, a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 302 (such as, for example, one or more internal registers or caches), one or more portions of memory 304, one or more portions of storage 306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device of a user, in response to data to be sent to or from the computing device, determining an amount of bandwidth currently available to the computing device for the data;
    by the computing device, accessing a behavior profile of the user that comprises one or more first probability values, wherein:
        each of the first probability values corresponds to a particular time interval within a time period and indicates a probability that the user will be at a location with a particular bandwidth; and
        the behavior profile was constructed based at least in part on activities of the user that were monitored and collected by the computing device on a periodic basis;
    by the computing device, determining based at least in part on the behavior profile a second probability value for each of one or more particular future time intervals within a future time period, wherein each of the second probability values indicates, for the particular future time interval within the future time period, a probability that the user will be at a location that has higher bandwidth available than the amount of bandwidth currently available to the computing device; and
    scheduling all or a portion of the data to be sent to or from the computing device based at least in part on one or more of the second probability values.

2. The method of claim 1, further comprising:
    determining a priority associated with the data; and
    scheduling all or a portion of the data to be sent based at least in part on the priority.

3. The method of claim 1, further comprising:
    determining a future time when the computing device is likely not to have any available bandwidth; and
    scheduling all or a portion of the data to be sent before the future time.

4. The method of claim 1, wherein determining the second probability value for a particular future time interval within the future time period comprises:
- mapping the particular future time interval to one of the particular time intervals; and
- associating the amount of bandwidth currently available to the computing device with the first probability value corresponding to the particular time interval mapped to the particular future time interval.

5. The method of claim 1, wherein the periodic basis is based at least in part on a predetermined time interval.

6. The method of claim 1, wherein monitoring and collecting the activities of the user comprises:
- at a plurality of times:
  - detecting one or more bandwidths available to the computing device at the respective time;
  - detecting the location of the computing device; and
  - associating the time with the bandwidths available to the computing device and the location of the computing device.

7. A system comprising:
- one or more processors; and
- a memory coupled to the processors comprising instructions executable by the processors, the processors being operable when executing the instructions to:
- in response to data to be sent to or from a computing device of a user, determine an amount of bandwidth currently available to the computing device for the data;
- access a behavior profile of the user that comprises one or more first probability values, wherein:
  - each of the first probability values corresponds to a particular time interval within a time period and indicates a probability that the user will be at a location with a particular bandwidth; and
  - the behavior profile was constructed based at least in part on activities of the user that were monitored and collected by the computing device on a periodic basis;
- determine based at least in part on the behavior profile a second probability value for each of one or more particular future time intervals within a future time period, wherein each of the second probability values indicates, for the particular future time interval within the future time period, a probability that the user will be at a location that has higher bandwidth available than the amount of bandwidth currently available to the computing device; and
- schedule all or a portion of the data to be sent to or from the computing device based at least in part on one or more of the second probability values.

8. The system of claim 7, wherein the processors are further operable when executing the instructions to:
- determine a priority associated with the data; and
- schedule all or a portion of the data to be sent based at least in part on the priority.

9. The system of claim 7, wherein the processors are further operable when executing the instructions to:
- determine a future time when the computing device is likely not to have any available bandwidth; and
- schedule all or a portion of the data to be sent before the future time.

10. The system of claim 7, wherein determining the second probability value for a particular future time interval within the future time period comprises:
- mapping the particular future time interval to one of the particular time intervals; and
- associating the amount of bandwidth currently available to the computing device with the first probability value corresponding to the particular time interval mapped to the particular future time interval.

11. The system of claim 7, wherein the periodic basis is based at least in part on a predetermined time interval.

12. The system of claim 7, wherein monitoring and collecting the activities of the user comprises:
- at a plurality of times:
  - detecting one or more bandwidths available to the computing device at the respective time;
  - detecting the location of the computing device; and
  - associating the time with the bandwidths available to the computing device and the location of the computing device.

13. One or more computer-readable non-transitory storage media embodying software that is operable when executed to:
- in response to data to be sent to or from a computing device of a user, determine an amount of bandwidth currently available to the computing device for the data;
- access a behavior profile of the user that comprises one or more first probability values, wherein:
  - each of the first probability values corresponds to a particular time interval within a time period and indicates a probability that the user will be at a location with a particular bandwidth; and
  - the behavior profile was constructed based at least in part on activities of the user that were monitored and collected by the computing device on a periodic basis;
- determine based at least in part on the behavior profile a second probability value for each of one or more particular future time intervals within a future time period, wherein each of the second probability values indicates, for the particular future time interval within the future time period, a probability that the user will be at a location that has higher bandwidth available than the amount of bandwidth currently available to the computing device; and
- schedule all or a portion of the data to be sent to or from the computing device based at least in part on one or more of the second probability values.

14. The media of claim 13, wherein the software is further operable when executed to:
- determine a priority associated with the data; and
- schedule all or a portion of the data to be sent based at least in part on the priority.

15. The media of claim 13, wherein determining the second probability value for a particular future time interval within the future time period comprises:
- mapping the particular future time interval to one of the particular time intervals; and
- associating the amount of bandwidth currently available to the computing device with the first probability value corresponding to the particular time interval mapped to the particular future time interval.

16. The media of claim 13, wherein the periodic basis is based at least in part on a predetermined time interval.

17. The media of claim 13, wherein monitoring and collecting the activities of the user comprises:
- at a plurality of times:
  - detecting one or more bandwidths available to the computing device at the respective time;
  - detecting the location of the computing device; and
  - associating the time with the bandwidths available to the computing device and the location of the computing device.

18. The media of claim 13, wherein the software is further operable when executed to:
- determine a priority associated with the data; and
- schedule all or a portion of the data to be sent based at least in part on the priority.

* * * * *